US009219931B2

(12) United States Patent
Xu et al.

(10) Patent No.: US 9,219,931 B2
(45) Date of Patent: Dec. 22, 2015

(54) METHOD AND APPARATUS FOR TRANSMITTING AND RECEIVING SERVICE DISCOVERY INFORMATION IN MULTIMEDIA TRANSMISSION SYSTEM AND FILE STRUCTURE FOR THE SAME

(75) Inventors: Yiling Xu, Suwon-si (KR); Sung-Ryeul Rhyu, Yongin-si (KR); Jae-Yeon Song, Seoul (KR); Kyung-Mo Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 237 days.

(21) Appl. No.: 13/091,588

(22) Filed: Apr. 21, 2011

(65) Prior Publication Data

US 2011/0265138 A1  Oct. 27, 2011

(30) Foreign Application Priority Data

Apr. 21, 2010  (KR) .................. 10-2010-0037111

(51) Int. Cl.
*H04N 21/2362* (2011.01)
*H04N 21/2343* (2011.01)
*H04N 21/854* (2011.01)
*H04L 29/08* (2006.01)
*H04N 21/434* (2011.01)

(52) U.S. Cl.
CPC ...... *H04N 21/2362* (2013.01); *H04L 29/08648* (2013.01); *H04N 21/4345* (2013.01); *H04N 21/85406* (2013.01)

(58) Field of Classification Search
CPC .................. H04N 21/2362; H04N 21/85406; H04N 21/4345; H04L 29/08648
See application file for complete search history.

(56) References Cited

U.S. PATENT DOCUMENTS

| | | | |
|---|---|---|---|
| 8,272,013 B2* | 9/2012 | Malik | 725/49 |
| 2004/0208204 A1* | 10/2004 | Crinon | 370/537 |
| 2007/0028274 A1* | 2/2007 | Walker et al. | 725/90 |
| 2007/0280257 A1 | 12/2007 | Vare et al. | |
| 2008/0127259 A1* | 5/2008 | Hong et al. | 725/39 |
| 2008/0178248 A1* | 7/2008 | Kim et al. | 725/134 |
| 2008/0225778 A1 | 9/2008 | Vare et al. | |
| 2008/0267152 A1 | 10/2008 | Alnas et al. | |
| 2009/0055866 A1* | 2/2009 | Song et al. | 725/39 |
| 2009/0260032 A1 | 10/2009 | Li et al. | |
| 2010/0274874 A1 | 10/2010 | Reunamaki | |

OTHER PUBLICATIONS

Digital Video Broadcasting (DVB); Transport of MPEG-2 TS Based DVB Services over IP Based Networks, ETSI TS 102 034 V1.3.1, Oct. 2007.

* cited by examiner

*Primary Examiner* — Mark D Featherstone
(74) *Attorney, Agent, or Firm* — The Farrell Law Firm, P.C.

(57) ABSTRACT

A method and apparatus are provided for transmitting service discovery information in a multimedia transmission system. Service discovery information, including service access information for reception of a service, is generated. The service discovery information is transmitted after being classified into a plurality of levels.

20 Claims, 10 Drawing Sheets

METHOD AND APPARATUS FOR TRANSMITTING AND RECEIVING SERVICE DISCOVERY INFORMATION IN MULTIMEDIA TRANSMISSION SYSTEM AND FILE STRUCTURE FOR THE SAME

PRIORITY

This application claims priority under 35 U.S.C. §119(a) to a Korean Patent Application filed in the Korean Intellectual Property Office on Apr. 21, 2010 and assigned Serial No. 10-2010-0037111, the entire disclosure of which is incorporated herein by reference.

BACKGROUND OF THE INVENTION

1. Field of the Invention

The preset invention relates generally to a multimedia transmission system, and more particularly, to a method and apparatus for transmitting and receiving service discovery information in a multimedia transmission system, and a file structure for the same.

2. Description of the Related Art

ISO/IEC 14496-12 has proposed an International Organization for Standardization (ISO) base file format as a standard file format to be used for multimedia services. Having a flexible and extensible file structure, the ISO base file format is the basis of various multimedia file formats. The ISO base file format is designed to have an object-oriented structure so as to include various types of media resources and metadata, as a standardized file structure for packaging media resources and metadata. For example, the Joint Photographic Experts Group (JPEG) 2000, and $3^{rd}$ Generation Partnership Project (3GPP) file formats are made based on the ISO base file format, and the Moving Picture Experts Group (MPEG)-4 file format is also an extension of the ISO base file format.

FIG. 1 is a diagram illustrating the general format of an ISO base file.

The information and functions necessary for playing a plurality of media contents together are created in the form of an object-based box. In the embodiment illustrated in FIG. 1, an ISO base file 101 includes a movie box 'moov box' 103 and a media data box 'mdat box' 105. While the media data box 105 stores media data (or a media stream) such as video and audio, the movie box 103 stores temporal and spatial position information and codec information for the media data stored in the media data box 105.

More specifically, the movie box 103 includes information about how to configure media data such as video, audio, texts and images, in a single scene. In the movie box 103, tracks 'trak' 107, 109, and 111 include basic information and playback information of their associated media data.

The track 107 includes information about audio data, the track 109 includes information about video data, and the track 111 includes information for a streaming service. For example, if the media data is audio data, the track 107 may include encoding information for audio and information about the time required in playing the audio.

A structure of the ISO base file 101 includes consecutive objects, some of which may include other objects. In the format of the ISO base file 101, the consecutive objects constitute one presentation metadata box (or the movie box 103). The movie box 103 has a dependent box defined as a container box having metadata for presentation. The media data box 105 is defined as a box having actual media data for the presentation, and the tracks 107, 109, and 111 are defined as a set of samples that are time-consecutive in the ISO base file 101. In case of multimedia data, the tracks 107 and 109 correspond to consecutive image samples or consecutive audio samples, and the hint track 111 corresponds to information about a streaming channel.

A multimedia transmission system using the above file format structure requires a method and apparatus for performing service discovery so that a client may find or select appropriate files to play.

SUMMARY OF THE INVENTION

The present invention has been made to address at least the above-mentioned problems and/or disadvantages and to provide at least the advantages described below. Accordingly, an aspect of the present invention provides an efficient service discovery method and apparatus based on a file format in a multimedia transmission system.

Another aspect of the present invention provides a method and apparatus for transmitting and receiving file format-based service discovery information in a multimedia transmission system.

An additional aspect of the present invention provides an efficient service discovery method and apparatus based on an ISO base file format in a multimedia transmission system.

A further aspect of the present invention provides a structure of service discovery information for service discovery in a multimedia transmission system.

According to one aspect of the present invention, a method is provided for transmitting service discovery information in a multimedia transmission system. Service discovery information including service access information is generated for reception of a service. The service discovery information is transmitted after slicing the service discovery information into a plurality of levels.

According to another aspect of the present invention, an apparatus is provided for transmitting service discovery information in a multimedia transmission system. The apparatus includes a transmission unit for transmitting reception-related information for a service. The apparatus also includes a control unit configured to generate service discovery information including service description information and service access information for reception of the service, and configured to transmit the service discovery information after slicing the service discovery information into a plurality of levels.

According to an additional aspect of the present invention, a method is provided for receiving service discovery information in a multimedia transmission system. Service discovery information, which is for reception of a service and includes service access information, is received using a service discovery entry point. Information about a channel over which the service is received is acquired by accessing each entity of the service discovery information. The service discovery information is received after being classified into a plurality of levels.

According to a further aspect of the present invention, an apparatus is provided for receiving service discovery information in a multimedia transmission system. The apparatus includes a reception unit for receiving reception-related information for a service. The apparatus also includes a control unit configured to receive service discovery information, which is for reception of the service and includes service access information, using a service discovery entry point, and to acquire information about a channel over which the service is received, by accessing each entity of the service discovery information. The service discovery information is received after being classified into a plurality of levels.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
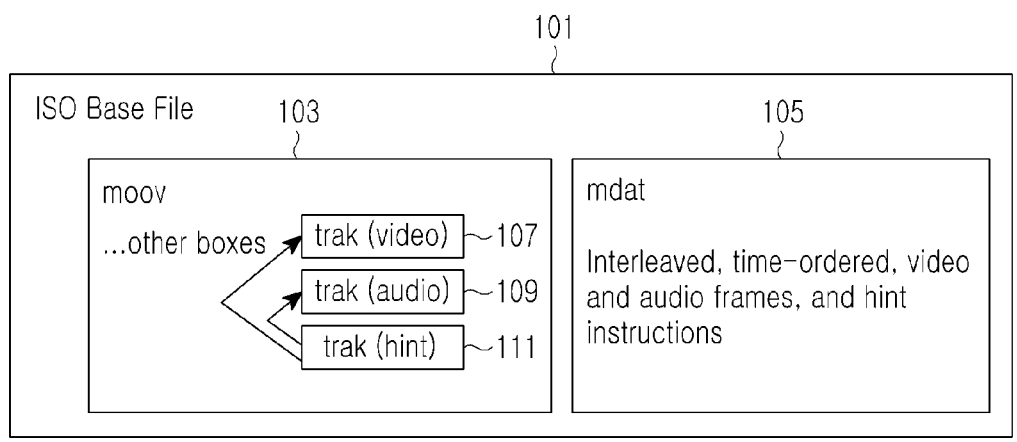
FIG. 1 is a diagram illustrating the general format of an ISO base file.

Embodiments of the present invention are described in detail with reference to the accompanying drawings. The same or similar components may be designated by the same or similar reference numerals. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. Detailed descriptions of constructions or processes known in the art may be omitted to avoid obscuring the subject matter of the present invention.

As described above, the ISO base file format has two types of boxes, and the boxes may be construed herein as object-oriented blocks. Referring to FIG. 1, for example, one of the two kinds of boxes is the movie box 103 defining metadata for presentation, and the other one is the media data box 105 including actual data for presentation. An embodiment of the present invention provides a structure of service discovery information, based on which a client may find or select appropriate files to play in a multimedia transmission system. This embodiment of the present invention also provides a method and apparatus for transmitting/receiving and updating the service discovery information. Although the ISO base file format will be considered a media file format in the following description of the service discovery method according to an embodiment of the present invention, the present invention may be applied to a variety of other media files consisting of object-oriented blocks, including the ISO base file.

Prior to a detailed description of the present invention, methods of configuring, discovering, and delivering service discovery information provided by the present invention are briefly described below.

The following three methods describe methods of configuring service discovery information with a new structure based on a media file format.

i. A method of configuring service discovery information, which may be accessed earlier than the boxes in the existing file format;

ii. A method of configuring information to make it possible to identify detailed service information in a file using the service discovery information; and iii. A method of configuring service discovery information to make it possible to select appropriate service components without accessing the entire file and parsing syntaxes therein.

The following methods of configuring new service discovery metadata are provided.

i. A method of basically configuring channel information, component information, schedule, acquisition information, and purchase information, in related metadata; and ii. A method of providing detailed information about each channel and each component using the above information.

The following methods of updating service discovery information are provided.

i. A method of configuring and providing service discovery update information in an entry point of service discovery information; and ii. A method of adding an entity for service discovery update, in service discovery metadata.

The following methods of delivering service discovery information are provided.

i. A method of delivering service discovery information on a level basis;

ii. A method of selecting primary-level data and most frequently transmitting this data;

iii. A method of selecting mid-level data, and transmitting it after slicing, less frequently compared with the primary-level data; and iv. A method of selecting low-level data, and transmitting it after slicing, less frequently compared with the mid-level data.

A method and a client apparatus are provided, in which service discovery information is obtained and based thereon. Access is made to a channel or a component providing a service to access.

A method and a server apparatus are provided, in which service discovery information is generated by gathering information about a channel or a component, and then provided to a client.

Figure 2:
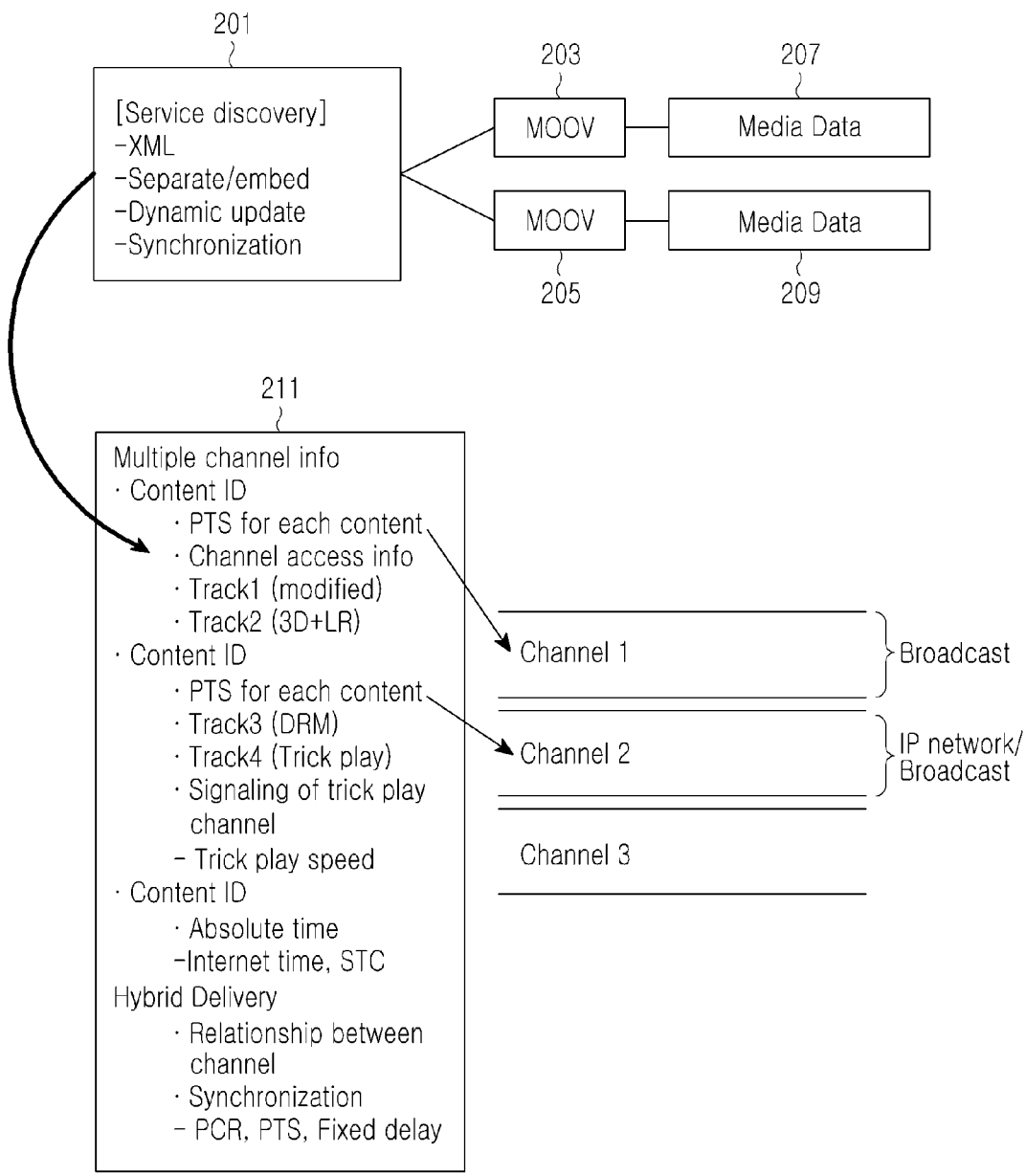
FIG. 2 is a diagram illustrating a structure of service discovery information applicable to a multimedia transmission system, according to an embodiment of the present invention.

FIG. 2 is a diagram illustrating a structure of service discovery information applicable to a multimedia transmission system, according to an embodiment of the present invention.

Referring to FIG. 2, service discovery information 201 may be described in, for example, an Extensible Markup Language (XML), a Synchronized Multimedia Integration Language (SMIL), or other appropriate languages.

The service discovery information 201 may be separated, or embedded in other boxes 203, 205, 207, and 209 in the media file. No matter how the service discovery information 201 is separated or whether it is embedded in other boxes, an entry point for service discovery should be defined. Specifically, the service discovery information 201 may be separated from the media file and transmitted independently, or may be transmitted in the media file.

For example, a unique identifier, an address (Internet Protocol (IP) address, a Uniform Resource Locator (URL), an offset in bytes, etc.), a location, a box name, etc. may be used to indicate an entry point. From this information, a client may easily access service discovery information, and acquire information about the service. The service discovery information may provide information for accessing a media file carrying the described service. The service discovery information 201 may be dynamically updated when the service information is updated.

The service discovery information 201 may provide information for service synchronization. The information for service synchronization is required to synchronize a plurality of contents carried by, for example, different channels. Reference numeral 211 represents channel information, a relationship between channels, synchronization information, etc. included in the service discovery information 201.

In an embodiment of the present invention, the service discovery information 201 provides service description information and access information. Based on the service description information and the access information, a client may choose appropriate content configuration information and may gain information on how to access the content. A structure of metadata constituting the service discovery information 201, according to an embodiment of the present invention, is described in detail below with reference to FIG. 3.

Figure 3:
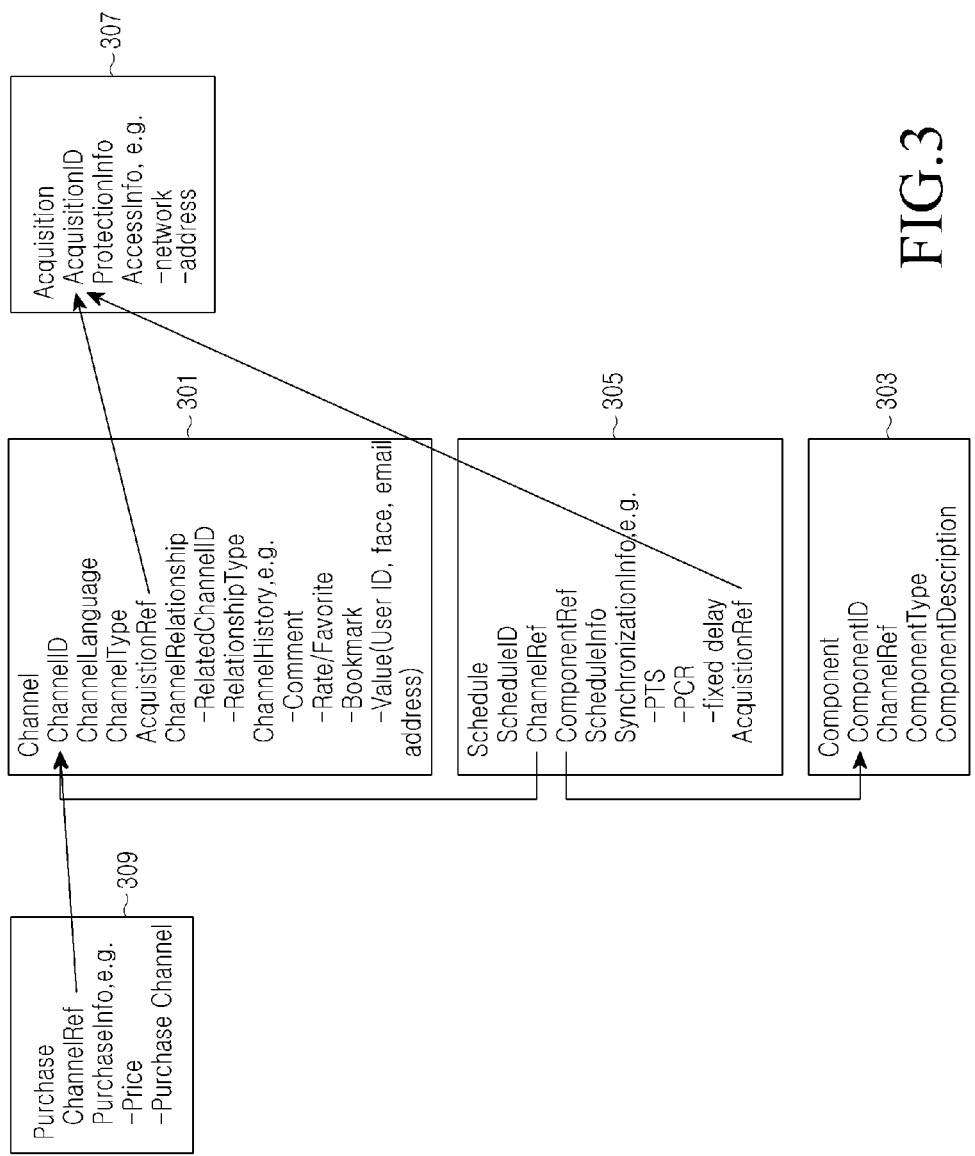
FIG. 3 is a diagram illustrating a structure of metadata of service discovery information, according to an embodiment of the present invention.

Referring to FIG. 3, the service discovery information of an embodiment of the present invention includes at least one of 5 representative entities: channel information 'Channel' 301, content component information 'Component' 303, schedule 305, access information 'Acquisition' 307, and purchase information 'Purchase' 309.

The entities constituting the service discovery information are described in greater detail below. The detailed information included in the following entities is provided as examples, and the detailed information optionally may be included in the associated entities according to the configuration of the service discovery information.

The channel information 301 provides an entire information description about one channel, and may include the following information.
  channelID: channel identifier
  channelDescription: provides textual description of the channel.
  ChannelLanguage: specifies primary language information of the content available in the channel.
  acquisitionRef: specifies acquisitionID of an acquisition fragment providing the general information for the channel.
  channelRelationship: specifies a relationship between this channel and other channels. The relationship is described in relationshipType, some examples of which are given below. Several relationships between channels, defined by the relationshipType, are available according to an embodiment of the present invention.
  Mandatory: means that the referred (or referenced) channel is mandatory.
  Alternative: means that the referred channel is an alternative channel for the current channel.
  Optional: means that the referred channel is an optional to access.
  channelHistory: specifies history information for the channel. For example, information about several devices the channel has experienced may be included. That information may include, for example, a user comment, a user rate/favorite, a user bookmark, and a value (userID, user's facial picture, e-mail address, etc.).

Aside from the above-described information, more channel-related information may be added in the channel information 301.

In the component 303, each channel may have multiple components, for example, A/V tracks, DRM information, trick play information, Left/Right (L/R) tracks of 3D content. These components may be described as set forth below.
  componentID: component identifier.
  channelRef: specifies a channel identifier referred by the component.
  componentType: specifies the type of the component, e.g., A/V tracks, DRM information, trick play information, L/R tracks of 3D content, different language tracks, etc.

The schedule 305 specifies information about, for example, playback time of the channel and the component, which may be described as set forth below.
  scheduleID: a schedule fragment identifier.
  channelRef: specifies a channel identifier described by the schedule.
  componentRef: specifies a component identifier described by the schedule.
  scheduleInfo: specifies the access or presentation time for each channel and component.
  synchronizationInfo: specifies the synchronization information, e.g., information about the Presentation Time Stamp (PTS) where a plurality of contents or components will begin in sync with each other. In addition, in case of convergence of a broadcast channel and an IP channel, PTS, Program Clock Reference (PCR), and fixed delay time for playing content on the broadcast channel and content on the IP channel in sync with each other, may be an example of the synchronization information.
  acquisitionRef: specifies acquisitionID referred by the schedule.

The acquisition (access information) 307 provides information for access to a channel or a component, which may be described as set forth below.
  acquisitionID: an acquisition fragment identifier
  protectionInfo: provides protection information for the channel/component.
  accessInfo: provides access information for the channel/component, including access network information (IP network, broadcast network, point-to-point network, etc.) and its access address (URL, offset in bytes, etc.).

The purchase information 309 provides purchase information for the channel, which may be described as set forth below.
  channelRef: specifies a channel identifier for purchasing.
  purchaseInfo: specifies, for example, price, purchase channel, etc.

Aside from the above information, more purchase-related information for the channel may be added.

Figure 4:
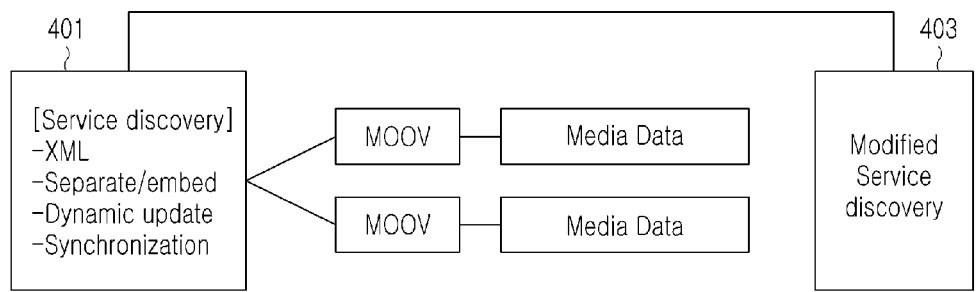
FIGS. 4 to 6 are diagrams illustrating methods of updating service discovery information, according to embodiments of the present invention.
Figure 5:
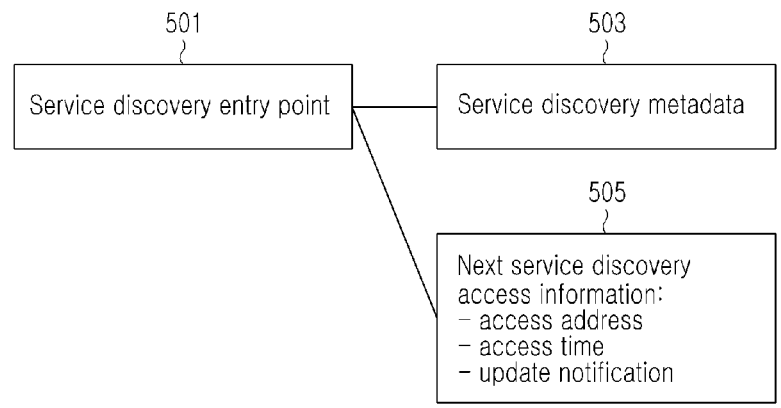
Figure 6:
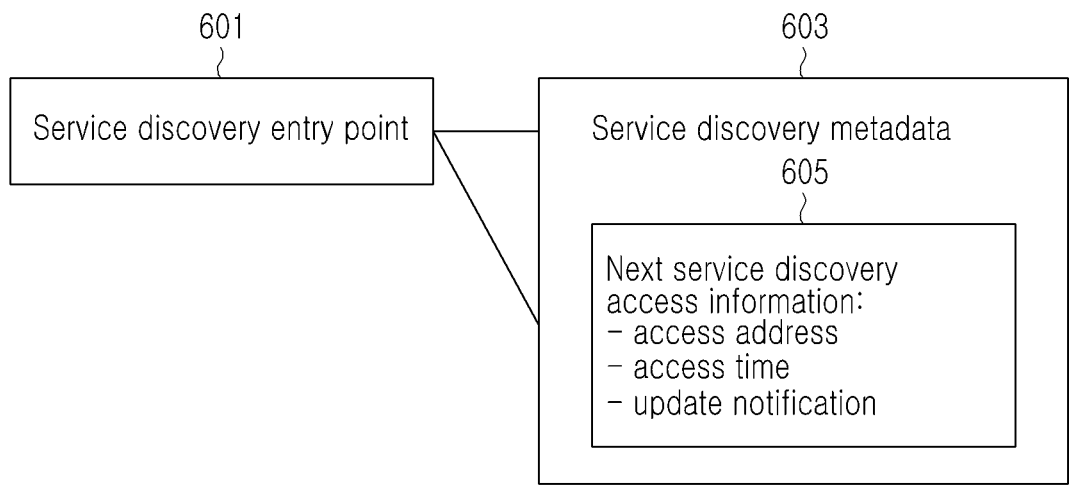

FIGS. 4 to 6 illustrate methods of updating service discovery information, according to an embodiment of the present invention.

The channel information may be updated. For example, in the case of a live broadcast, the channel information keeps changing. Therefore, service discovery information 401 may be updated to modified service discovery information 403, as shown in FIG. 4.

To this end, information (e.g., an address of a network from which updated service discovery information may be received) for updating the service discovery information may be added in an entry point of the service discovery information. In this case, a client may find necessary information including metadata of the service discovery information from the entry point of the service discovery information.

Two different solutions for updating the service discovery information are described in detail below.

Solution 1 adds a new entity 505 in a service discovery entry point 501 in addition to service discovery metadata 503, as shown in FIG. 5, for updating the service discovery information. Using the new entity 505, a client may get an access address and an access time for the updated service discovery information, and may also book the service discovery notification information.

Solution 2 adds a new entity 605 about service discovery update information in service discovery metadata 603, as shown in FIG. 6. Specifically, aside from the 5 entities described with reference to FIG. 3, the new entity 605 may be added in the service discovery metadata 603, for updating the service discovery information. The new entity 605 specifies the next service discovery and provides its access information. By accessing the service discovery information, the client may access the service discovery update information at the same time.

Figure 7A:
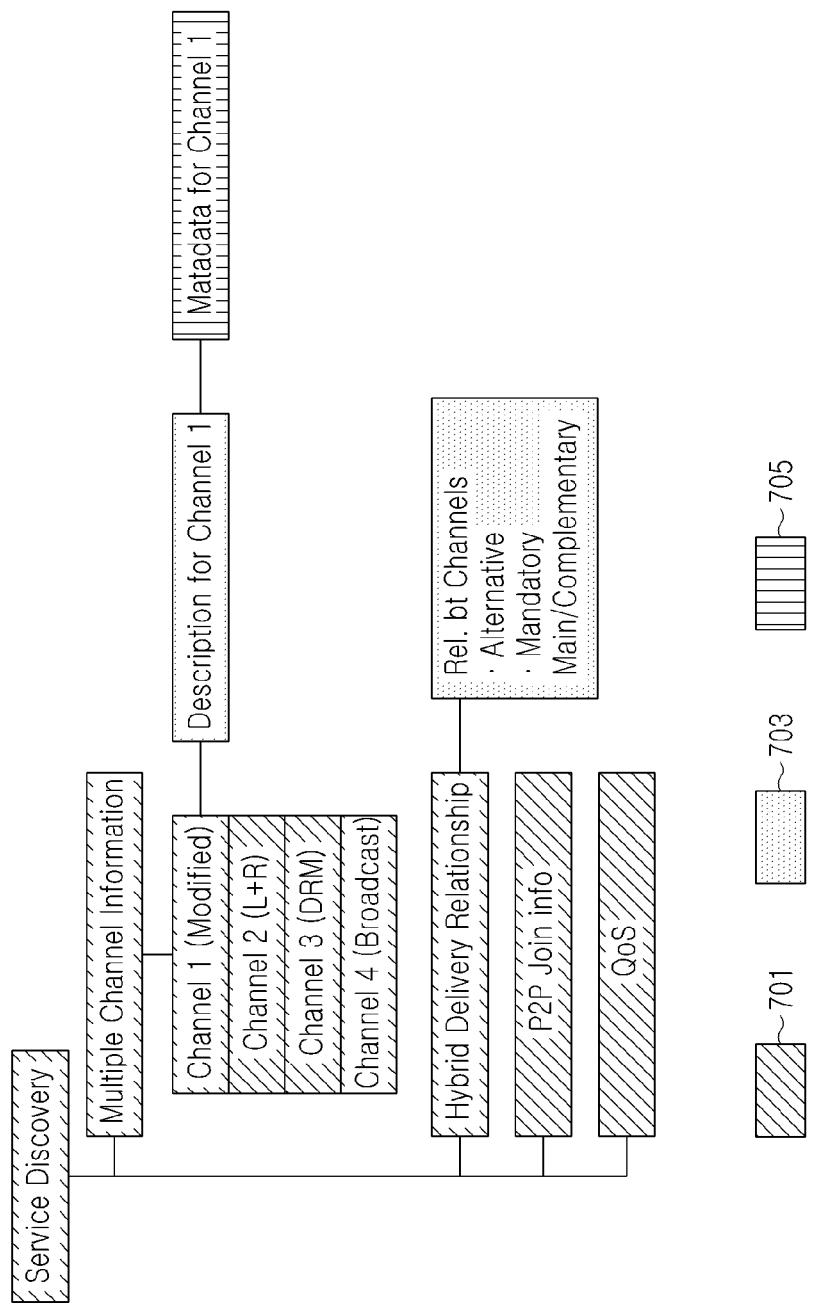
FIGS. 7A and 7B are diagrams illustrating a method of transmitting service discovery information in a multimedia transmission system, according to an embodiment of the present invention.
Figure 7B:
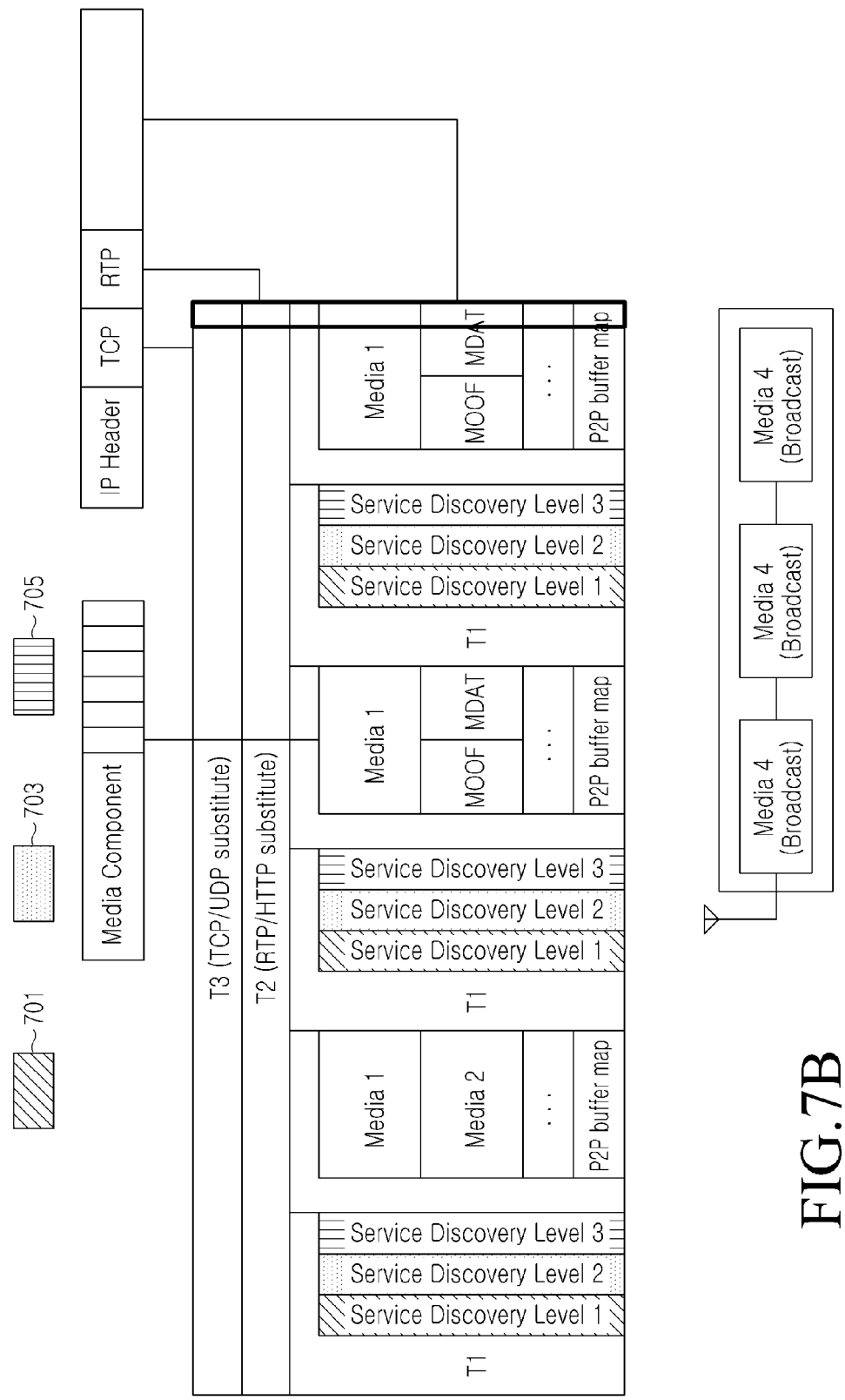

FIGS. 7A and 7B are diagrams illustrating a method of transmitting service discovery information in a multimedia transmission system, according to an embodiment of the present invention.

In an embodiment of the present invention, the service discovery information may be classified into three levels—primary level, middle level and low level—as illustrated in FIGS. 7A and 7B.

Service discovery information of a primary level 701 is very important and necessary information for the client. When access to the service begins, the client inevitably needs the service discovery information of the primary level 701. The information, with which the basic service may be started without service discovery information of other levels, belongs to the primary level 701. For example, this information may include information about multiple channels and relationships between channels. This information will be delivered to the client frequently and repeatedly.

Service discovery information, such as a description of a channel, and a detailed relationship between channels, belongs to a middle level 703. Information of the middle level 703 is transmitted less frequently compared with the information of the primary level 701. The service discovery information of the middle level 703 may be transmitted several times after being classified.

Details of the service discovery information for each channel may belong to a low level 705. For example, a channel name, its schedule, and acquisition information are the low-level information. The information of the low level 705 is transmitted less frequently compared with the information of the middle level 703 because of its large size. The service discovery information of the low level 705 may be transmitted several times after being classified.

A client block illustrated on the bottom of FIG. 7B and receiving Media 4 (broadcast), indicates that the embodiment of the present invention may be applied to broadcast services. A block illustrated on the top of FIG. 7B indicates that the embodiment of the present invention may be applied to broadband services such as an IP service. Specifically, the service discovery information, according to an embodiment of the present invention, may be applied not only to the broadband services, but also to broadcast services.

Figure 8:
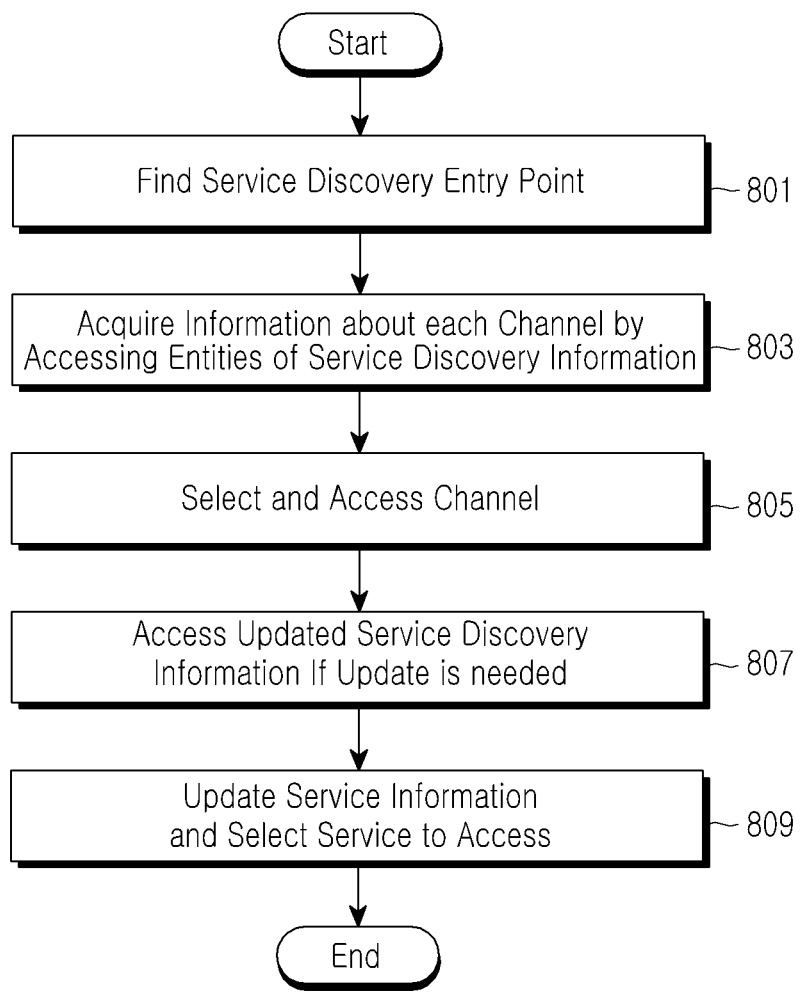
FIG. 8 is a flowchart illustrating a process of receiving service discovery information by a client in a multimedia transmission system, according to an embodiment of the present invention.

FIG. 8 is a diagram illustrating a process of receiving service discovery information by a client in a multimedia transmission system, according to an embodiment of the present invention.

A client first finds a service discovery entry point, in step 801. For example, it may include a well-known address for a specific service. Using the address, the client accesses entities of service discovery information and acquires information about each channel, in step 803. Specifically, the client acquires service discovery metadata, and obtains detailed information about each channel. Using this information, the client selects the channel to access, in step 805. If the client needs to update the service discovery information, the client accesses updated service discovery information, in step 807. If the service discovery information is updated, the client may access the updated service discovery information to update the related information according to the methods described above with reference to FIGS. 4 to 6, select a channel based on the updated service discovery metadata, and then play the selected channel, in step 809.

Figure 9:
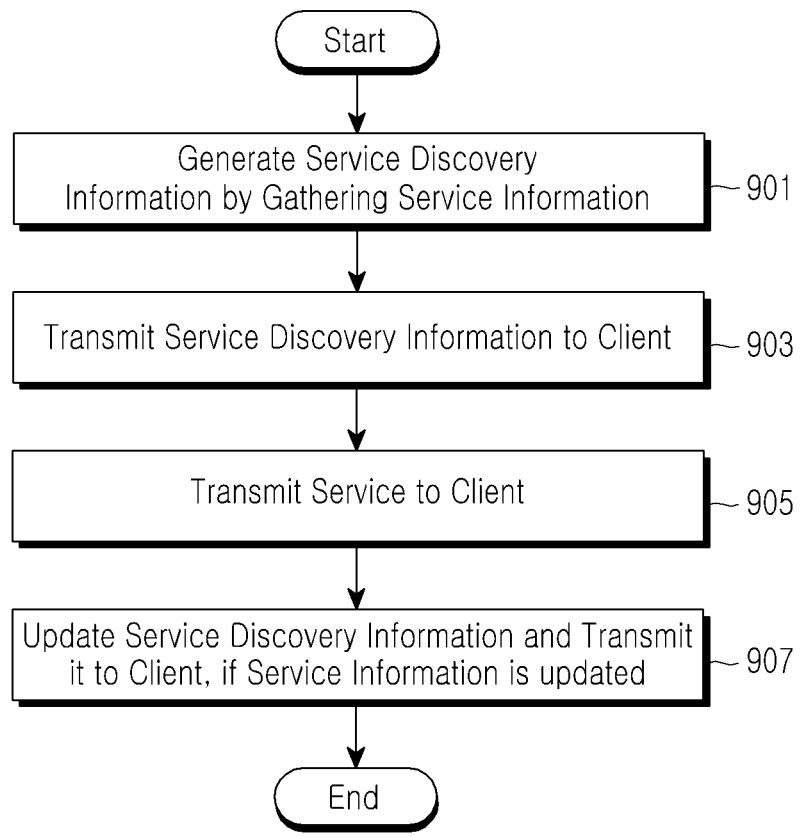
FIG. 9 is a flowchart illustrating a process of transmitting service discovery information by a server in a multimedia transmission system, according to an embodiment of the present invention.

FIG. 9 is a diagram illustrating a process of transmitting service discovery information by a server in a multimedia transmission system, according to an embodiment of the present invention.

In step 901, a server generates service discovery information by gathering channel information. In step 903, the server transmits the generated service discovery information to a client, or transmits the service discovery information at the request of the client. Thereafter, the server transmits a related service to the client in step 905. If the service discovery information is updated, the server updates the service discovery information by modifying its metadata and provides the updated service discovery information to the client in step 907.

Figure 10:
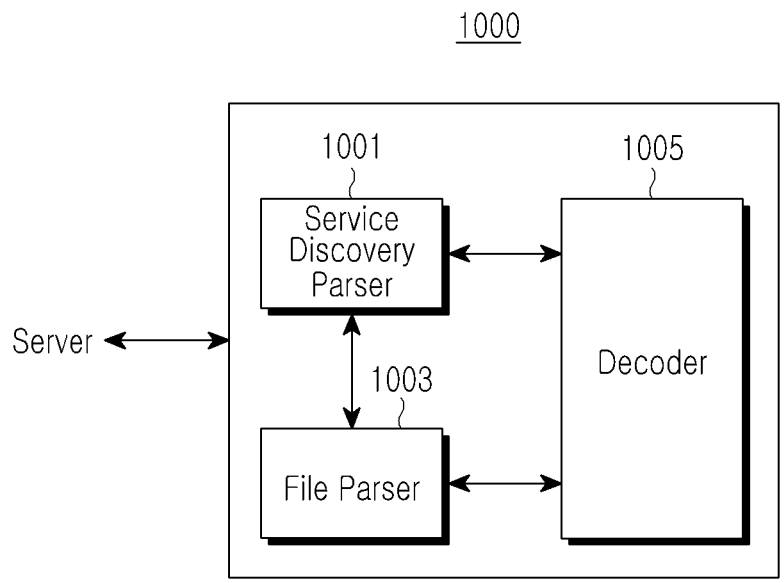
FIG. 10 is a block diagram illustrating a structure of a client in a multimedia transmission system, according to an embodiment of the present invention.
Figure 11:
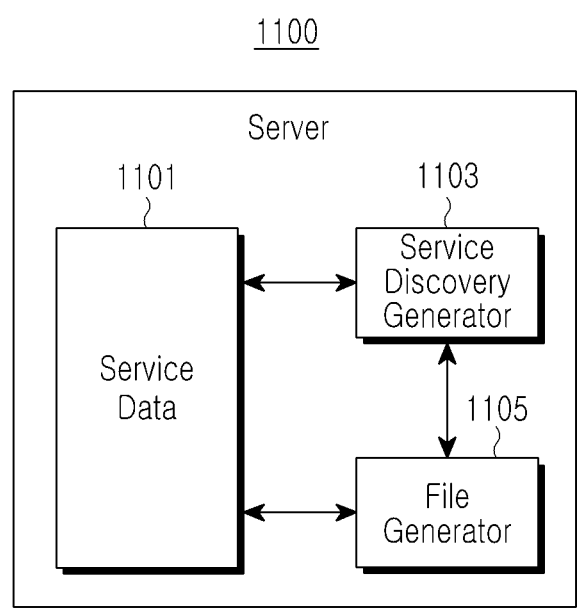
FIG. 11 is a block diagram illustrating a structure of a server in a multimedia transmission system, according to an embodiment of the present invention.

A client in FIG. 10 and a server in FIG. 11 transmit and receive the service discovery information according to the methods described above with reference to FIGS. 2 to 9, thereby transmitting and receiving a service.

FIG. 10 illustrates a structure of a client in a multimedia transmission system, according to an embodiment of the present invention.

Referring to FIG. 10, a client 1000 includes a service discovery parser 1001, a file parser 1003, and a decoder 1005. The service discovery parser 1001 is a syntax parser that reads and parses metadata of service discovery information. The file parser 1003 reads media data from a received media file, and delivers the read media data to the decoder 1005. The decoder 1005 restores the media data to its original data. A receiver of a multimedia transmission system, including the client 1000, may be realized with a control unit including the service discovery parser 1001, the file parser 1003, and the decoder 1005, and a reception unit for receiving the service discovery information over a specific network FIG. 11 illustrates a structure of a server in a multimedia transmission system, according to an embodiment of the present invention.

Referring to FIG. 11, a server 1100 includes a service discovery information generator 1103, and a file generator 1105. The server 1100 generates a media file including metadata and media data of service discovery information using service data 1101 without being processed, and also generates its associated information. The service discovery information is generated by the service discovery information generator 1103, and the file generator 1105 generates a media file including the service discovery information and media data. The service discovery information may be generated separately from the media file. The server 1100 may be realized with a control unit including the service discovery information generator 1103 and the file generator 1105, and a transmission unit for transmitting the service discovery information.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A method for transmitting service discovery information in a multimedia transmission system, comprising the steps of:
    generating service discovery information including service access information for reception of a service;
    classifying portions of the service discovery information into a plurality of levels according to an importance of each portion of the service discovery information; and
    transmitting, to a receiver, each level of the plurality of levels including each portion of the service discovery information a number of times based on a level of the plurality of levels to which each portion is classified, each level of the plurality of levels corresponding to a different number of times for transmission, and the number of times for transmission increasing as the importance increases.

2. The method of claim 1, wherein the service discovery information is transmitted separately from a media file.

3. The method of claim 1, wherein the service discovery information is transmitted together with a media file.

4. The method of claim 1, wherein the service discovery information comprises at least one of channel information, content component information, schedule information, acquisition information, and purchase information for service reception.

5. The method of claim 1, further comprising:
    updating the service discovery information; and
    providing a client with information for access to the updated service discovery information.

6. The method of claim 4, wherein the channel information comprises channel relationship information indicating a relationship between channels providing the service, the schedule information comprises synchronization information for synchronized playback of content or a component, and the acquisition information comprises network information for access to the content or the component.

7. An apparatus for transmitting service discovery information in a multimedia transmission system, comprising:
    a transmitter configured to transmit reception-related information for a service; and
    a controller configured to generate service discovery information including service description information and service access information for reception of the service, classify portions of the service discovery information into a plurality of levels according to an importance of each portion of the service discovery information, and transmit, to a receiver, each level of the plurality of levels including each portion of the service discovery information a number of times based on a level of the plurality of levels to which each portion is classified, each level of the plurality of levels corresponding to a different number of times for transmission, and the number of times for transmission increasing as the importance increases.

8. The apparatus of claim 7, wherein the service discovery information is transmitted separately from a media file.

9. The apparatus of claim 7, wherein the service discovery information is transmitted together with a media file.

10. The apparatus of claim 7, wherein the service discovery information comprises at least one of channel information, content component information, schedule information, acquisition information, and purchase information for service reception.

11. The apparatus of claim 7, wherein the control unit is configured to update the service discovery information, and provide a client with information for access to the updated service discovery information.

12. The apparatus of claim 10, wherein the channel information comprises channel relationship information indicating a relationship between channels providing the service, the schedule information comprises synchronization information for synchronized playback of content or a component, and the acquisition information comprises network information for access to the content or the component.

13. A method for receiving service discovery information in a multimedia transmission system, comprising the steps of:
    receiving each level of a plurality of levels including each portion of service discovery information, which is for reception of a service and includes service access information, using a service discovery entry point, a number of times based on a level of the plurality of levels to which each portion is classified, each level of the plurality of levels corresponding to a different number of times for reception, and the number of times for reception increasing as the importance increases; and
    acquiring information about a channel over which the service is received, by accessing each portion of the service discovery information.

14. The method of claim 13, wherein the service discovery information comprises at least one of channel information, content component information, schedule information, acquisition information, and purchase information for service reception.

15. The method of claim 13, further comprising updating the service discovery information by acquiring information for access to updated service discovery information.

16. The method of claim 14, wherein the channel information comprises channel relationship information indicating a relationship between channels providing the service, the schedule information comprises synchronization information for synchronized playback of content or a component, and the acquisition information includes network information for access to the content or the component.

17. An apparatus for receiving service discovery information in a multimedia transmission system, comprising:
    a receiver configured to receive reception-related information for a service; and
    a controller configured to receive each level of a plurality of levels including each portion of service discovery information, which is for reception of the service and includes service access information, using a service discovery entry point, a number of times based on a level of the plurality of levels to which each portion is classified, each level of the plurality of levels corresponding to a different number of times for transmission, and the number of times for transmission increasing as the importance increases, and configured to acquire information about a channel over which the service is received, by accessing each portion of the service discovery information.

18. The apparatus of claim 17, wherein the service discovery information comprises at least one of channel information, content component information, schedule information, acquisition information, and purchase information for service reception.

19. The apparatus of claim 17, wherein the controller is configured to update the service discovery information by acquiring information for access to updated service discovery information.

20. The apparatus of claim 18, wherein the channel information comprises channel relationship information indicating a relationship between channels providing the service, the schedule information comprises synchronization information for synchronized playback of content or a component, and the acquisition information comprises network information for access to the content or the component.

\* \* \* \* \*